(12) United States Patent
Herzog

(10) Patent No.: US 6,241,446 B1
(45) Date of Patent: Jun. 5, 2001

(54) SHELF SUPPORT ASSEMBLY

(75) Inventor: Richard R. Herzog, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/537,019

(22) Filed: Mar. 28, 2000

(51) Int. Cl.⁷ .............................. F16B 37/08; F16B 43/00
(52) U.S. Cl. .......................... 411/533; 411/433; 411/546
(58) Field of Search .................................. 411/433, 437, 411/531, 533, 546, 908

(56) References Cited

U.S. PATENT DOCUMENTS

| | | | | |
|---|---|---|---|---|
| 3,083,796 | * | 4/1963 | Bell, Jr. | 411/546 X |
| 4,828,444 | * | 5/1989 | Oshida | 411/437 |
| 5,098,242 | * | 3/1992 | Schaty | 411/433 |
| 5,302,070 | * | 4/1994 | Kameyama et al. | 411/437 |

* cited by examiner

Primary Examiner—Neill Wilson
(74) Attorney, Agent, or Firm—Pitney, Hardin, Kipp & Szuch LLP

(57) ABSTRACT

The shelf support assembly includes an integral disk and shank with an aperture through the longitudinal axis thereof. A screw passes through the aperture. Flexible arms are formed around an opening in the disk formed by the aperture. The flexible arms engage the threads of screw during a pre-assembled position. However, the flexible arms deflect in response to axial urging of the screw thereby allowing the screw to move axially during the initial insertion of the screw into the pre-assembled position. This deflection further occurs in response to subsequent axial adjustment of the screw prior to installation, in response to the dropping of the shelf support assembly in the pre-assembled position thereby allowing the flexible arms to absorb a portion of the energy of the fall, and in response to the installation of the shelf support assembly into the mounting panel.

7 Claims, 6 Drawing Sheets

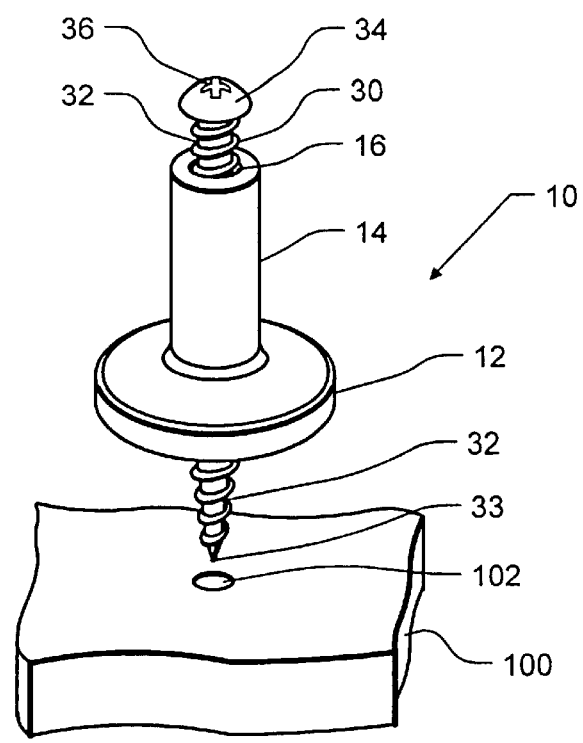
F I G. 1
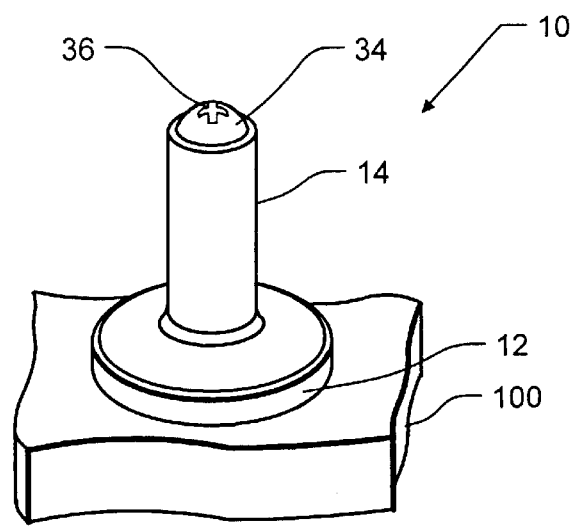
F I G. 2

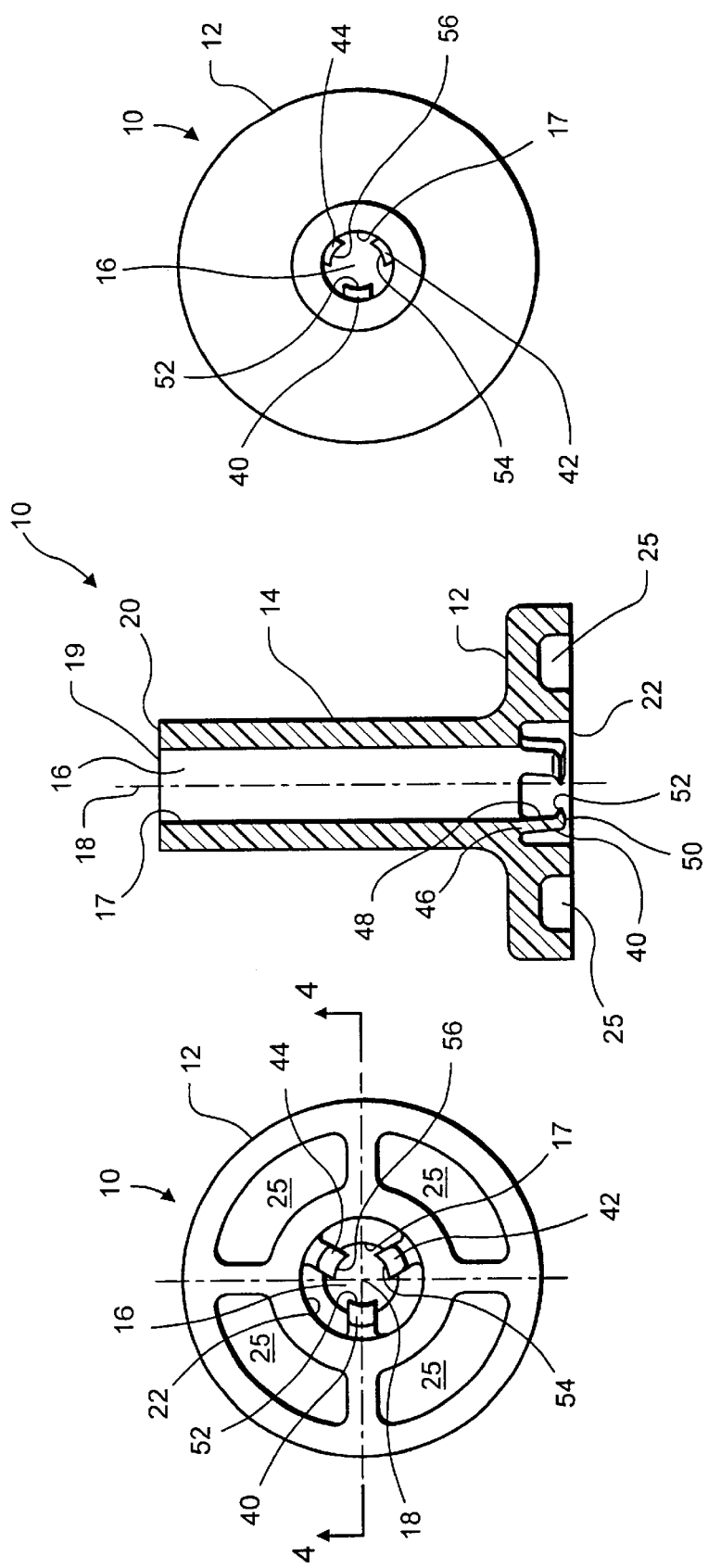

SHELF SUPPORT ASSEMBLY

BACKGROUND OF THE INVENTION

1. Field of the Invention

This invention pertains to an assembly for supporting a shelf. In particular, this assembly includes arms which deflect thereby allowing the straight-line pre-assembly of a screw into the assembly. The flexible arms thereafter retain the screw in place and allow the screw to be threaded into the final assembled configuration.

2. Description of the Prior Art

In the prior art, shelf support assemblies, such as those used for refrigerators, were secured to the wall in the final assembled position by such devices as twist supports and screws. However, sometimes the screw could not be pre-assembled in the shelf support assembly, thereby requiring the separate packaging and shipment of the shelf support assemblies and the screws thereby increasing assembly time and cost. Similarly, prior to final assembly, sometimes the screw would fall out and require additional assembly time and cost to re-assemble. While some shelf support assemblies allowed pre-assembly by rotatably driving the screw into the internal threads of the shelf support assembly, this required an extra step in pre-assembly process and likewise may have required an extra step to adjust the position of the screw prior to final assembly.

While some prior art designs employed stubby fingers within the through-aperture of the assembly to secure the screw during pre-assembly, the sharp edges of the screws had a tendency to shear off the stubby fingers during insertion.

Other prior art designs have included detent members rather than screws which have been somewhat deficient with respect to secure installation.

OBJECTS AND SUMMARY OF THE INVENTION

It is therefore an object of the present invention to provide a shelf support assembly which allows pre-assembly of a screw into the shelf support assembly with a simple straight-line motion.

It is therefore a further object of the present invention to provide a shelf support assembly which allows straight-line adjustment of the screw in the pre-assembled position.

It is therefore a still further object of the present invention to provide a shelf support assembly which retains the screw in the pre-assembled position, allowing the shelf support assembly to be shipped in the pre-assembled position and retaining the screw during most drops of the shelf support assembly.

It is therefore a still further object of the present invention to provide a shelf support assembly wherein the sharp edges of the screw do not have a tendency to shear retention arms or similar structural elements.

It is therefore a still further object of the present invention that the retention feature of the screw does not significantly increase the torque required to drive the screw into the mounting panel.

It is therefore a final object of the present invention to provide the above objects while maintaining low manufacturing, shipping and installation costs and a simple design.

These and other objects are attained by providing a shelf support assembly with a through-aperture and flexible arms spaced about a circumference of the through-aperture. The flexible arms deflect completely outwardly during the straight-line insertion or positional adjustment of the screw, and engage the threads of the screw thereby retaining the screw in the pre-assembled position while allowing the rotational driving of the screw during the final installation procedure. Moreover, this deflection of the arms tends to prevent the shearing of the arms by the sharp edges of threads of the screws. Furthermore, the deflection of the arms can absorb the shock of a drop in the pre-assembled position, allowing the screw to skip perhaps one or two threads, and re-engage in a pre-assembled position. The equal spacing of three flexible arms about a circumference of the through-aperture assures that all flexible arms are engaged in the root diameter of the screw threads to obtain maximum retention. The use of three flexible arms may be considered redundant in order to allow for tolerance variation.

BRIEF DESCRIPTION OF THE DRAWINGS

Further objects and advantages of the invention will become apparent from the following description and claims, and from the accompanying drawings, wherein:

FIG. 1 is a perspective view of the shelf support assembly of the present invention, shown in the pre-installed position exploded away from the aperture in the support panel, with the screw being retained by the shelf support assembly.

FIG. 2 is a perspective view of the shelf support assembly of the present invention, shown in the fully installed position engaging a panel, FIG. 3 is a bottom plan view of the shelf support assembly of the present invention.

FIG. 4 is a side cross-sectional view of the shelf support assembly of the present invention, along plane 4—4 of FIG. 3.

FIG. 5 is a top plan view of the shelf support assembly of the present invention.

DETAILED DESCRIPTION OF THE PREFERRED EMBODIMENT

Figure 6:
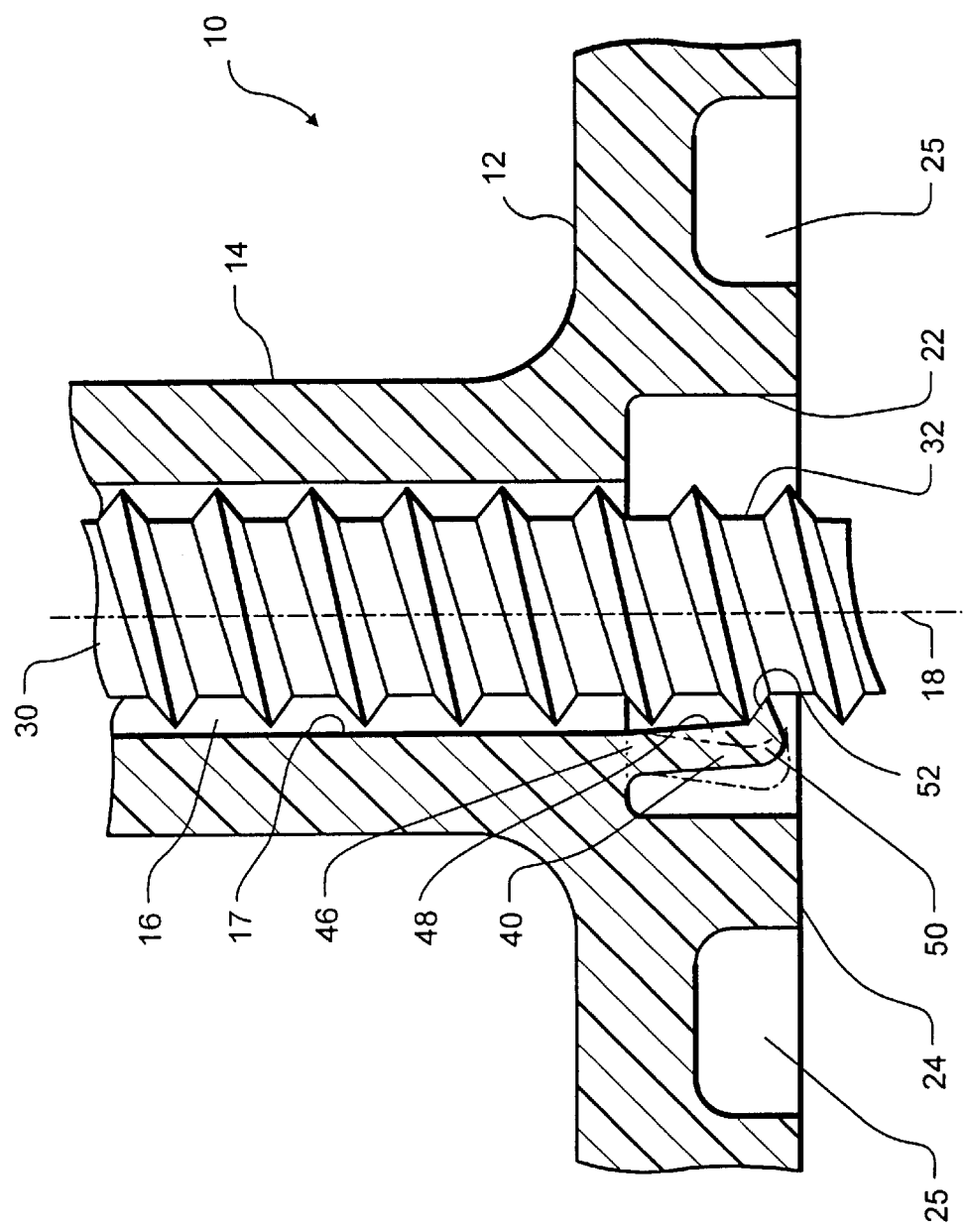
FIG. 6 is a detailed side cross-sectional view of the shelf support assembly of the present invention, showing the span of deflection of one of the flexible arms.

Referring now to the drawings in detail wherein like numerals indicate like elements throughout the several views, one sees that FIG. 1 is a perspective view of the pre-installed configuration of the shelf support assembly 10 of the present invention, FIG. 2 is a perspective view of the installed configuration of the shelf support assembly 10 of the present invention, with FIGS. 3, 4 and 5 showing various views of the shelf support assembly 10 of the present invention.

Shelf support assembly 10 is typically integrally formed of molded plastic chosen to provide the desired flexibility.

Shelf support assembly 10 includes circular disk member 12 which, as shown in FIG. 2, is designed to be flush with panel 100 after installation. Cylindrical shank 14 rises from the center of circular disk member 12. Through-aperture 16 formed by inner cylindrical wall 17 passes through longitudinal axis 18 of circular disk member 12 and cylindrical shank 14. Opening 19 is formed on end 20 of cylindrical shank 14 and opening 22 is formed on lower surface 24 of circular disk member 12. Lower surface 24 is molded with depressions 25. Opening 22 is somewhat enlarged from the diameter of through-aperture 16.

Screw 30 is inserted into through-aperture 16 and intended to be of standard design with threaded shank 32, tip 33 and enlarged head 34, enlarged head 34 preferably having slots 36 or similar structure or impressions for use with a pneumatic driver that retains the screw head during assembly.

As shown in FIG. 3, flexible arms 40, 42, 44 are spaced about a circumference of opening 22. As shown in FIG. 4, flexible arm 40 is oriented parallel to longitudinal axis 18 with proximal end 46 joining circular disk member 12 and inner surface 48 contiguous with inner cylindrical wall 17. Flexible arm 40 further includes distal end 50 with radially inwardly pointing retaining finger 52. Flexible arms 42, 44 have identical structures including radially inwardly pointing retaining fingers 54, 56, respectively, as shown in FIGS. 3 and 5.

As shown in FIG. 6, flexible arm 40 (as well as flexible arms 42, 44) engages a thread of screw 30 thereby acting as an internal thread, but deflects in response to the axial urging of screw 30 thereby allowing screw 30 to be moved axially without the need for rotational driving. In other words, the angled surfaces of retaining fingers 52, 54, 56 and the complementary angled surfaces of the threads of screw 30 cause the ramping or deflection of flexible arms 40, 42, 44 in response to the axial urging of screw 30. This allows the insertion of screw 30 into the pre-driven position as shown in FIG. 1 or the adjustment of the position of screw 30 immediately prior to installation. Moreover, deflection of arms 40, 42, 44 can absorb the shock of a drop in the pre-assembled position, allowing screw 30 to skip perhaps one or two threads, and re-engage in a pre-assembled position.

Figure 7:
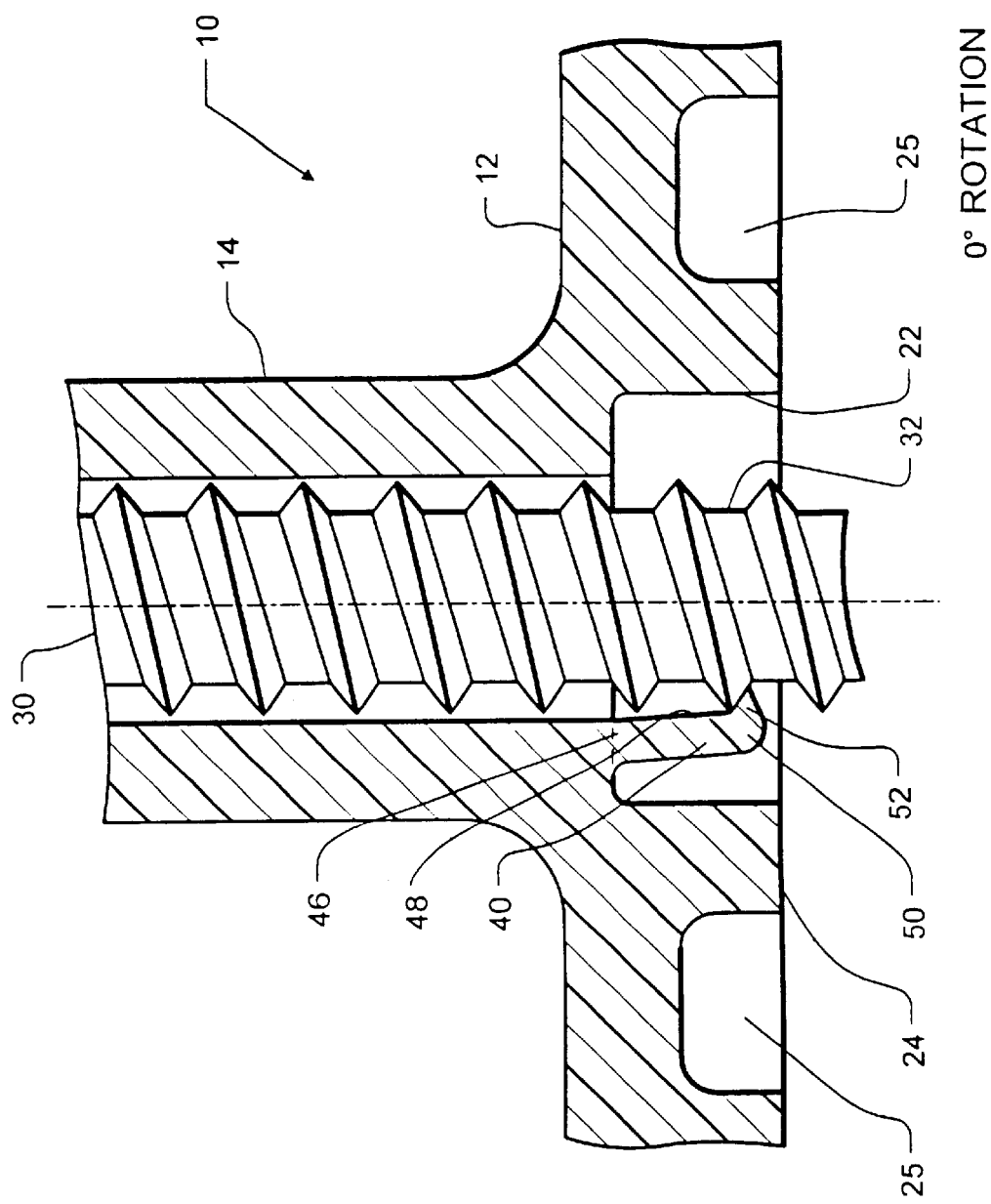
FIG. 7 is a detailed side cross-sectional view of the shelf support assembly of the present invention, showing one of the flexible arms engaging a thread of the screw.
Figure 8:
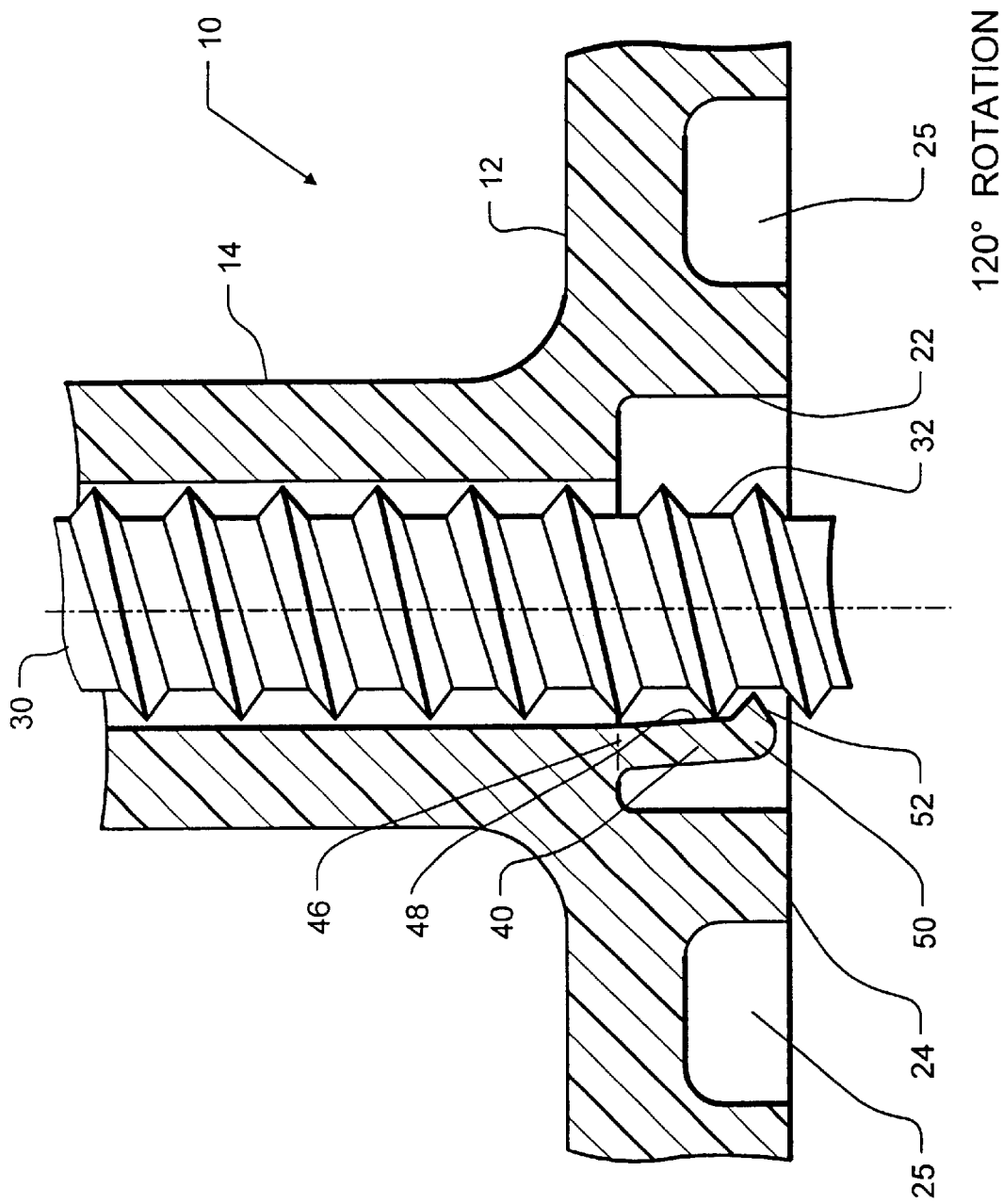
FIG. 8 is a detailed side cross-sectional view of the shelf support assembly of the present invention, illustrating a 120° relative rotation of the screw and the shelf support assembly from the position shown in FIG. 7.
Figure 9:
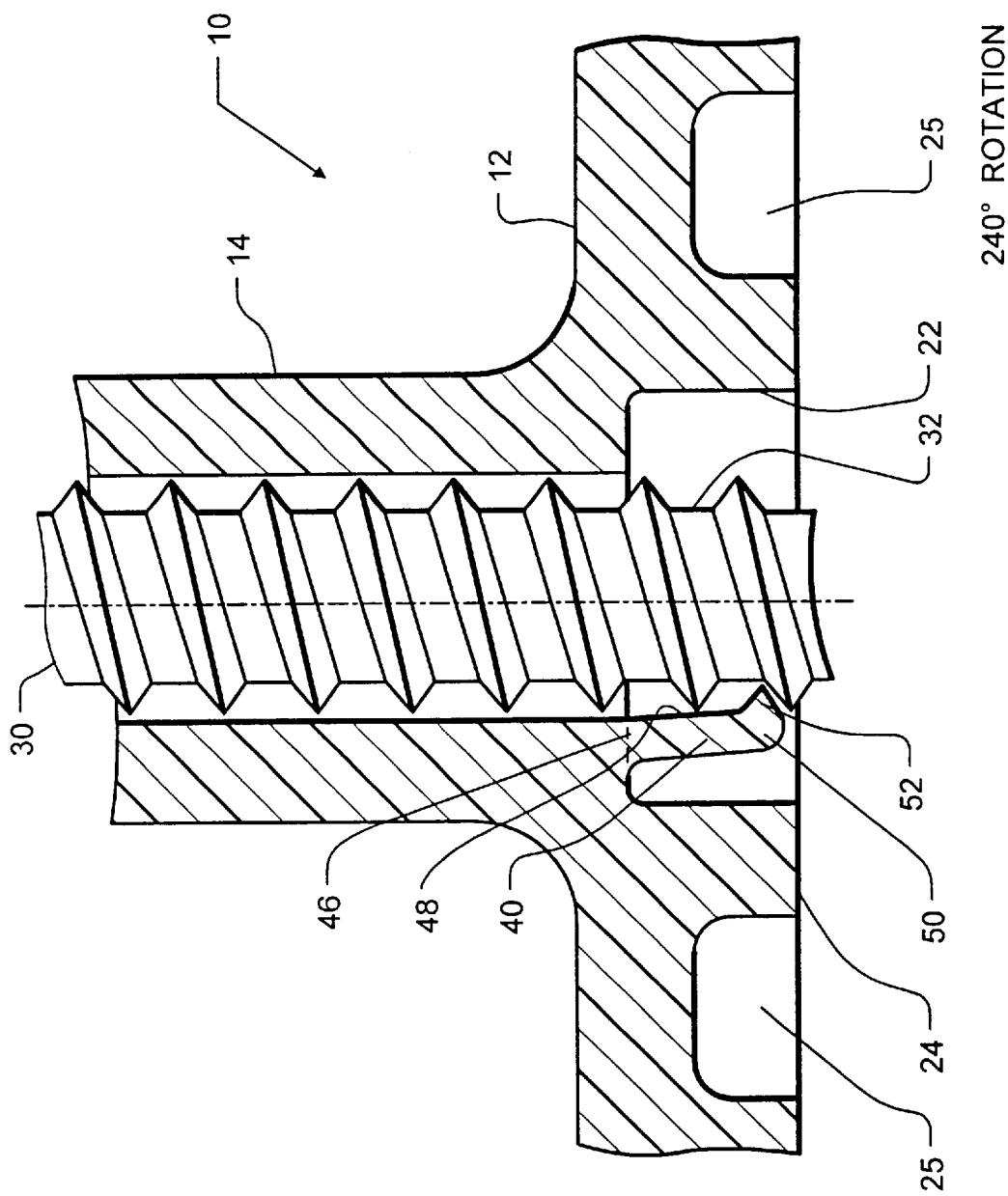
FIG. 9 is a detailed side cross-sectional view of the shelf support assembly of the present invention, illustrating a 240° relative rotation of the screw and the shelf support assembly from the position shown in FIG. 7.

The sequence of FIGS. 7, 8 and 9 illustrate the redundancy of flexible arms 40, 42, 44, showing that one flexible arm engages the threads of screw 30 throughout the rotation of screw 30. Additionally, the equal spacing of flexible arms 40, 42, 44 about a circumference of opening 22 assures that flexible arms 40, 42, 44 are engaged in the root diameter of the threads of screw 30 to obtain maximum retention. Moreover, the use of three flexible arms may be considered redundant in order to allow for tolerance variation.

Shelf support assembly 10 typically has screw 30 axially driven into through-aperture 16 to achieve the pre-assembled configuration of FIG. 1 prior to shipping. The user then receives shelf support assembly 10 in the configuration shown in FIG. 1. The user may axially adjust the position of screw 30 and then inserts tip 33 of screw 30 into aperture 102 of panel 100 (see FIG. 1) and rotatably drives screw 30 in a conventional manner until the fully installed configuration of FIG. 2 is achieved with lower surface 24 of circular disk member 12 tightly engaged against panel 100, with the torque required to drive the screw not significantly affected due to flexible arms 40, 42, 44.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A support device including:

a shank;

a surface integral with said shank;

an aperture passing through said shank, said aperture, forming a first opening in said shank and a second opening in said surface;

a screw including a head and a threaded shaft, said head abutting an end of said shank proximate to said first opening in a fully installed position, and said threaded shaft passing through said aperture and protruding from said second opening to engage an external object thereby allowing said shank to provide support for objects exerting a force lateral to said shank;

at least one flexible arm with a finger extending into said aperture, said finger engaging said threaded shaft;

said at least one flexible arm, in response to axial urging of said screw, deflects outwardly thereby moving said finger away from said threaded shaft and allowing said screw to move axially through said aperture in response to said axial urging, said at least one flexible arm thereafter returning to a position wherein said finger engages said threaded shaft.

2. The support device of claim 1 wherein said at least one flexible arm includes a plurality of flexible arms.

3. The support device of claim 2 wherein said plurality of flexible arms are evenly spaced about said second aperture.

4. The support device of claim 3 wherein said surface is formed on a disk integral with said shank, said disk being formed perpendicularly to said shank.

5. The support device of claim 4 wherein said plurality of flexible arms are formed parallel to a longitudinal axis of said aperture.

6. The support device of claim 5 wherein said plurality of flexible arms include inner surfaces contiguous with an inner wall of said aperture.

7. The support device of claim 1 wherein said shank, said surface and said at least one flexible arm are formed integrally from molded plastic.

* * * * *